UNITED STATES PATENT OFFICE.

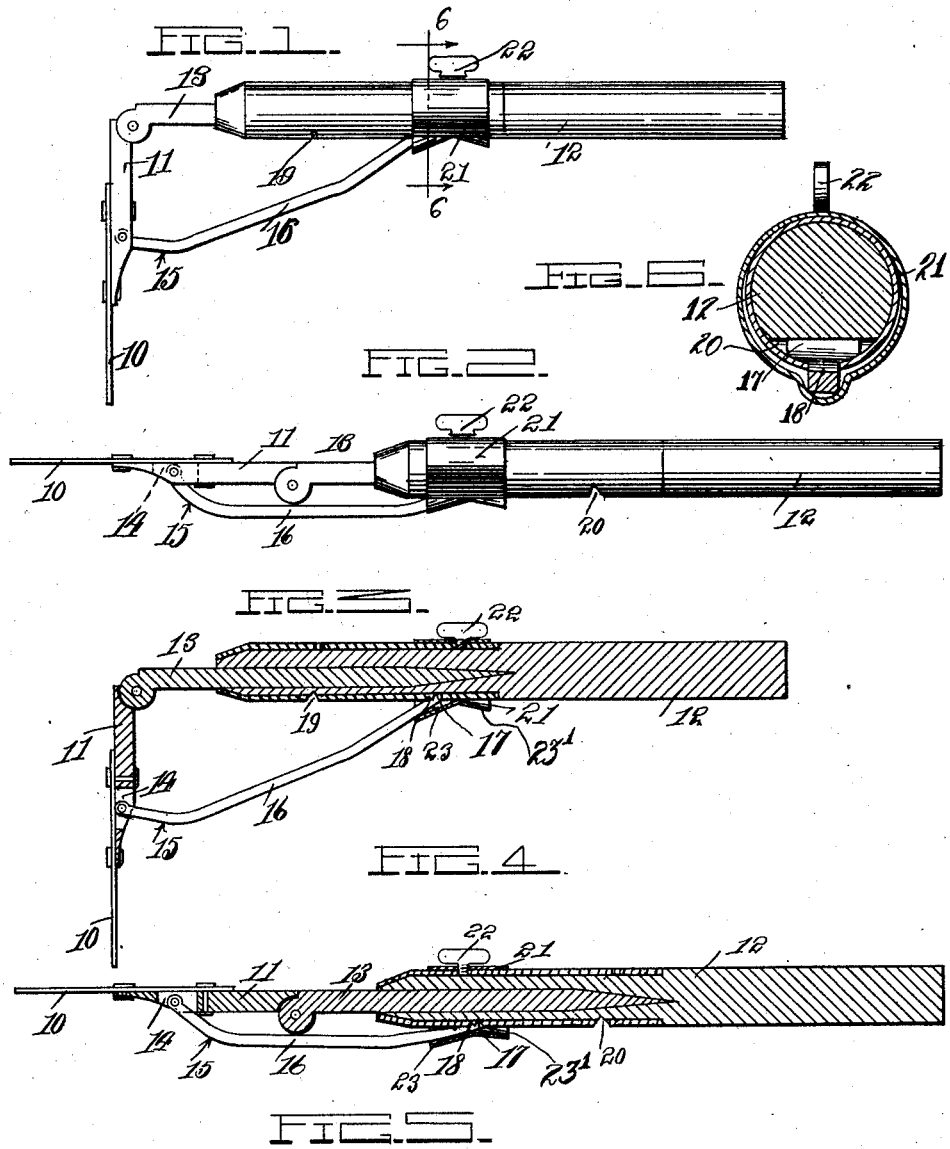

WILSON THOMPSON, OF LESLIE, ARKANSAS, ASSIGNOR OF ONE-HALF TO CHARLES V. RYNO, OF LESLIE, ARKANSAS.

CONVERTIBLE IMPLEMENT.

1,003,383.  Specification of Letters Patent.  Patented Sept. 12, 1911.

Application filed August 30, 1910. Serial No. 579,661.

*To all whom it may concern:*

Be it known that I, WILSON THOMPSON, a citizen of the United States, residing at Leslie, in the county of Searcy, State of Arkansas, have invented certain new and useful Improvements in Convertible Implements; and I do hereby declare the following to be a full, clear, and exact description of the invention, such as will enable others skilled in the art to which it appertains to make and use the same.

This invention relates to implements.

The object of the invention resides in the construction of an implement in which the tool member is pivotally connected to a handle and adapted to be locked in different angular adjustments with relation to the handle; said implement being adapted to be used for one purpose when the tool member is adjusted in one position and for another purpose when the tool member is adjusted and locked in another position.

With the above and other objects in view the invention consists in the details of construction and arrangement and combination of parts as will be hereinafter more fully set forth and described and particularly pointed out in the appended claim.

In describing the invention in detail reference will be had to the accompanying drawings wherein like characters of reference denote corresponding parts in the several views; and in which, Figure 1 is a side elevation of the invention with the tool element thereof adjusted so as to permit the use of the implement as a hoe; Fig. 2, a side elevation with the tool element adjusted so as to permit the use of the element as a spade; Fig. 3, a longitudinal section of what is shown in Fig. 1; Fig. 4, a longitudinal section of what is shown in Fig. 2; Fig. 5, a detail perspective view of the locking bar; and Fig. 6 is an enlarged section on the line 6—6 of Fig. 1.

Before proceeding with a detail description of the invention it will be noted that while there has been illustrated an implement or tool member which is designed for use as a hoe or a spade; the nature and construction of the tool element may be varied in detail without in any manner departing from the invention.

Referring to the drawings, the implement is shown as comprising a tool member 10 which has secured thereto and extending beyond one end thereof a shank 11. A handle 12 has one end provided with a reduced extension 13 to which is pivotally connected the outer end of the shank 11. Formed in the shank 11 is a slot 14 in which is pivotally mounted one end of a locking bar 15, the intermediate portion of which is slightly curved as at 16. The free end of the locking bar 15 terminates in a cross arm 17 and a series of serrations 18 are formed in said locking bar adjacent the cross arm. Formed in the handle 12 at spaced points are transversely disposed recesses 19 and 20, so shaped as to receive the free end of the locking bar 15 therein.

Slidably mounted upon the handle 12 is a sleeve 21 which carries a set screw 22 adapted to impinge upon the handle 12 so as to lock said sleeve against movement thereon. This sleeve 21 has formed therein an interiorly located wedge shaped groove 23 disposed adjacent the end of the handle to which the tool member is connected.

Should it be desired to use the implement as a spade it is only necessary to dispose the free end of the locking bar 15 in the recess 19 and move the sleeve 21 over the free end of the locking bar until a portion of the latter is disposed within the groove 23 and the sleeve overlies the recess 19. When in this position the sleeve is locked against movement on the handle 12 by means of set screw 21 and the implement is ready to be utilized as a spade.

It will be noted that the sleeve 21 is further provided with an interior groove 23' disposed oppositely to the groove 23. This groove 23' enables either end of the sleeve 21 to be inserted upon the handle. This construction of the sleeve 21 obviously produces an interior wedge which contacts with the lower side of the bar 16 and securely locks the cross head into the notches 20 against any undesired displacement.

Should it be desired to use the implement as a hoe the free end of the locking bar 15 is disposed in the recess 20 and the sleeve 21 moved with said locking bar until the former overlies the recess 20 and said bar is partially disposed in the groove 23, when the sleeve is locked against movement on the handle 12 by the manipulation of the set screw 22, and the implement is in position to be utilized as a hoe.

It will be understood that when the locking bar 15 is secured in either of the recesses 19 or 20 the serrations or teeth 18 are forced into engagement with the handle for increasing the efficiency of the detachable connection between said locking bar and handle.

What is claimed is:

The combination with a tool provided with a shank hinged intermediate its ends, a handle secured to one end of the shank, a rod pivoted to the opposite end of the shank, a cross arm formed upon the end of the rod, the said cross arm being V-shaped in cross section and adapted to engage one of a series of V-shaped notches located in the handle, a sleeve slidable upon the said handle, an off set at one side producing a groove adapted to receive the cross arm, whereby the said sleeve will be held against rotation, the said groove being deepened toward its outer end producing an interior wedge for contact with the end of the pivoted rod whereby the cross arm thereon will be held in engagement with one of the V-shaped notches and a set screw engaging the sleeve and the handle, substantially as and for the purposes set forth.

In testimony whereof, I affix my signature, in presence of two witnesses.

WILSON THOMPSON.

Witnesses:
LUTHER E. WARREN,
ELMO HAYNES.

---

Copies of this patent may be obtained for five cents each, by addressing the "Commissioner of Patents, Washington, D. C."